United States Patent
Tong et al.

(10) Patent No.: US 12,316,360 B2
(45) Date of Patent: May 27, 2025

(54) HIGH PERFORMANCE LOW COMPLEXITY MEMORYLESS DIGITAL PRE-DISTORTION

(71) Applicant: SAMSUNG ELECTRONICS CO., LTD., Suwon-si (KR)

(72) Inventors: Fei Tong, Cambridge (GB); Paul Nicholas Fletcher, Cambridge (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 18/220,235

(22) Filed: Jul. 10, 2023

(65) Prior Publication Data

US 2025/0023592 A1 Jan. 16, 2025

(51) Int. Cl.
*H04B 1/04* (2006.01)

(52) U.S. Cl.
CPC ..... *H04B 1/0475* (2013.01); *H04B 2001/045* (2013.01)

(58) Field of Classification Search
CPC .................................................. H04B 1/0475
USPC ......................................................... 375/297
See application file for complete search history.

(56) References Cited

U.S. PATENT DOCUMENTS

| | | | |
|---|---|---|---|
| 8,195,103 B2 | 6/2012 | Waheed et al. | |
| 9,337,781 B2 | 5/2016 | Hammi | |
| 9,641,206 B2 | 5/2017 | Pratt et al. | |
| 9,647,717 B2 | 5/2017 | Xiong et al. | |
| 10,931,241 B2 | 2/2021 | Brukiewa et al. | |
| 11,159,129 B2 | 10/2021 | Yang et al. | |
| 2009/0129257 A1* | 5/2009 | Maltsev | H03F 1/0205 370/208 |
| 2015/0043678 A1* | 2/2015 | Hammi | H03F 3/24 375/297 |

* cited by examiner

*Primary Examiner* — Lihong Yu
(74) *Attorney, Agent, or Firm* — MORGAN, LEWIS & BOCKIUS LLP

(57) ABSTRACT

A method of digital memoryless pre-distortion includes receiving an input digital signal from a signal source, calculating a look-up table (LUT) address from the input signal and a power scale, updating an LUT value associated with the LUT address based on the input signal and an output signal that is output from a power amplifier to a wireless communications channel, linearizing the output signal with the updated LUT value, and outputting the output signal to the wireless communications channel. The steps of updating an LUT value associated with the LUT address and linearizing the output signal with the updated LUT value are repeated until a level of linearization is achieved that meets a pre-defined standard.

20 Claims, 4 Drawing Sheets

Low complexity memoryless pre-distortion architecture

FIG. 1: Low complexity memoryless pre-distortion architecture

FIG. 2: Example of Performance

FIG. 3: Adjacent Channel Power Performance

HIGH PERFORMANCE LOW COMPLEXITY MEMORYLESS DIGITAL PRE-DISTORTION

TECHNICAL FIELD

Embodiments of the disclosure are directed to methods of digital pre-distortion.

DISCUSSION OF THE RELATED ART

Pre-distortion is a technique for increasing the linearity of a radio transmitter amplifier. Radio transmitter amplifiers in most telecommunications systems need to be linear, in that they must output a signal that accurately reproduces the input signal. Power amplifiers are inherently non-linear. An amplifier with a non-linear input/output relationship can cause the output signal to interfere with other radio frequencies. Pre-distortion modifies the signal to be amplified in a way that counteracts the distortion of the power amplifier, such that the output of the power amplifier is linear. Pre-distortion can be digitally implemented, known as digital pre-distortion.

Existing widely adopted digital pre-distortion training methods use least squares methods with either a direct learning or indirect learning architecture. These methods are able to handle memory effects of wideband power amplifiers but may be constrained for memoryless pre-distortion. Since existing methods solve a least squares task, they are considerably complex.

For reduced implementation complexity, the pre-distortion structure is commonly implemented as a Look-up Table (LUT). It is the combination of the LUTs and the power amplifier that linearizes the power amplifier. The training phase of a digital pre-distortion system, whereby the LUT is populated with a non-linear function that can sufficiently linearize a non-linear power amplifier (PA) transfer characteristic, is a key step in digital pre-distortion.

The common method to achieve this is by constructing a set of linear over-determined equations that solve for the set of coefficients that determine the weightings of the non-linear basis functions that construct the pre-distorted waveform. The coefficients may be transformed into an equivalent LUT structure to reduce implementation complexity.

Nonetheless, such an approach inherently requires two steps: (1) a least squares solution of an overdetermined set of equations; and (2) computation of the LUT. These two steps are required irrespective of the digital pre-distortion architecture considered (indirect or direct learning) and represent a considerable level of complexity, particularly step (1), which involves a matrix inverse.

SUMMARY

Embodiments of the disclosure provide a high performance memoryless digital pre-distortion training algorithm.

Embodiments of the disclosure compute an inverse gain per LUT address, as compared to solving a least squares problem from which a LUT may be computed.

Embodiments of the disclosure provide a method with reduced computational complexity and increased performance as compared with least squares based indirect or direct learning approaches.

According to an embodiment of the disclosure, there is provided a method of digital memoryless pre-distortion that includes receiving an input digital signal from a signal source, calculating a look-up table (LUT) address from the input signal and a power scale, updating an LUT value associated with the LUT address based on the input signal and an output signal that is output from a power amplifier to a wireless communications channel, linearizing the output signal with the updated LUT value, and outputting the output signal to the wireless communications channel. The steps of updating an LUT value associated with the LUT address and linearizing the output signal with the updated LUT value are repeated until a level of linearization is achieved that meets a pre-defined standard.

According to a further embodiment of the disclosure, the look-up table (LUT) address is calculated from $$a_n = \left\lfloor \frac{p|S_{i,n}|^2}{2^L} \right\rfloor,$$

wherein $a_n$ is the LUT address of an nth sample of the input signal, $S_{i,n}$ is the nth sample of the input signal, p is the power scale, $2^L$ is used to retain a predetermined number of upper bits in $a_n$, and $\lfloor \cdot \rfloor$ is the floor function.

According to a further embodiment of the disclosure, the LUT value associated with the LUT address is updated according to $$L(a) = (1 - \mu)L(a) + \mu L(a) \frac{g_{inv,acc}(a)}{T(a)},$$

wherein $L(a)$ is the LUT value associated with LUT address a, $g_{inv,acc}(a)$ is an accumulated inverse gain that is a function of the input signal and the output signal, $T(a)$ is a number of times that LUT address a has been indexed by samples of the input signal, and $\theta$ is a predetermined update rate parameter that determines the rate of convergence.

According to a further embodiment of the disclosure, $L(a)$ was initialized to 1.

According to a further embodiment of the disclosure, $T(a)$ is incremented when the LUT address associated with the nth sample of the input signal is equal to a.

According to a further embodiment of the disclosure, the accumulated inverse gain $g_{inv,acc}(a)$ is updated according to $g_{inv,acc}(a) = g_{inv,acc}(a) + g_{inv}(a)$ when the LUT address associated with the nth sample of the input signal is equal to a, wherein $g_{inv}(a)$ is an inverse gain.

According to a further embodiment of the disclosure, the inverse gain $g_{inv}(a)$ is calculated according to $$g_{inv}(a) = \sum \frac{S_{i,n}}{S_{o,n}}$$

when the LUT address associated with the nth sample of the input signal is equal to a, wherein $S_{i,n}$ is the nth sample of the input signal, $S_{o,n}$ is the nth sample of the output signal, and the sum is over N samples of the input signal and N samples of the output signal.

According to a further embodiment of the disclosure, the inverse gain $g_{inv}(a)$ is calculated according to $$g_{inv}(a) = \frac{\sum S_{i,n}}{\sum S_{o,n}}$$

when the LUT address associated with the nth sample of the input signal is equal to a, wherein $S_{i,n}$ is the nth sample of the input signal, $S_{o,n}$ is the nth sample of the output signal, and each sum is over N samples of the input signal and N samples of the output signal.

According to another embodiment of the disclosure, there is provided an apparatus for performing digital memoryless pre-distortion of a signal to be amplified that includes an address calculation circuit connected to an electronic signal source, a digital signal processor (DSP) connected to the electronic signal source an output of the address calculation circuit, and a wireless communications channel, a look-up table (LUT) connected to the electronic signal source, the output of the address calculation circuit, and an output of the DSP, and a power amplifier (PA) connected to an output of the LUT and that outputs an output signal to the wireless communications channel and the DSP. The address calculation circuit calculates an address for the LUT from an input signal received from the electronic signal source and a scale factor, the DSP updates an LUT value associated with the LUT address based on the input signal and the output signal received from the power amplifier, and the PA linearizes the output signal with the updated LUT value and outputs the output signal to the wireless communications channel.

According to a further embodiment of the disclosure, the address calculation circuit includes a first multiplier connected to the electronic signal source that sums squares of real and imaginary parts of the input signal and outputs a squared input signal, a second multiplier connected to an output of the first multiplier and that multiplies the squared input signal by the scale factor, and a shift register connected to an output of the second multiplier and divides the output of the second multiplier by $2^L$ wherein a predetermined number of upper bits of the second multiplier output are retained.

According to a further embodiment of the disclosure, the DSP repeatedly updates the LUT value associated with the LUT address and the PA repeatedly linearizes the output signal with the updated LUT value until a level of linearization is achieved that meets a pre-defined standard.

According to a further embodiment of the disclosure, the LUT value associated with the LUT address is updated according to $$L(a) = (1 - \mu)L(a) + \mu L(a)\frac{g_{inv,acc}(a)}{T(a)},$$

wherein L(a) is the LUT value associated with LUT address a, $g_{inv,acc}(a)$ is an accumulated inverse gain that is a function of the input signal and the output signal, T(a) is a number of times that LUT address a has been indexed by samples of the input signal, and θ is a predetermined update rate parameter.

According to a further embodiment of the disclosure, L(a) was initialized to 1.

According to a further embodiment of the disclosure, T(a) is incremented when the LUT address associated with the nth sample of the input signal is equal to a.

According to a further embodiment of the disclosure, the accumulated inverse gain $g_{inv,acc}(a)$ is updated according to $g_{inv,acc}(a)=g_{inv,acc}(a)+g_{inv}(a)$ when the LUT address associated with the nth sample of the input signal is equal to a, wherein $g_{inv}(a)$ is an inverse gain.

According to a further embodiment of the disclosure, the inverse gain $g_{inv}(a)$ is calculated according to $$g_{inv}(a) = \sum \frac{S_{i,n}}{S_{o,n}}$$

when the LUT address associated with the nth sample of the input signal is equal to a, wherein $S_{i,n}$ is the nth sample of the input signal, $S_{o,n}$ is the nth sample of the output signal, and the sum is over N samples of the input signal and N samples of the output signal.

According to a further embodiment of the disclosure, the inverse gain $g_{inv}(a)$ is calculated according to $$g_{inv}(a) = \frac{\sum S_{i,n}}{\sum S_{o,n}}$$

when the LUT address associated with the nth sample of the input signal is equal to a, wherein $S_{i,n}$ is the nth sample of the input signal, $S_{o,n}$ is the nth sample of the output signal, and each sum is over N samples of the input signal and N samples of the output signal.

According to another embodiment of the disclosure, there is provided a digital electronic circuit, tangibly embodying a program of instructions executed by the digital electronic circuit to perform a method for digital memoryless pre-distortion. The method includes receiving an input digital signal from a signal source, calculating a look-up table (LUT) address from the input signal and a power scale, and updating an LUT value associated with the LUT address based on the input signal and an output signal that is output from a power amplifier to a wireless communications channel. The LUT value associated with the LUT address is updated according to $$L(a) = (1 - \mu)L(a) + \mu L(a)\frac{g_{inv,acc}(a)}{T(a)},$$

wherein L(a) is the LUT value associated with LUT address a, $g_{inv,acc}(a)$ is an accumulated inverse gain that is a function of the input signal and the output signal, T(a) is a number of times that LUT address a has been indexed by samples of the input signal, and μ is a predetermined update rate parameter that determines the rate of convergence.

According to a further embodiment of the disclosure, T(a) is incremented when the LUT address associated with the nth sample of the input signal is equal to a, and the accumulated inverse gain $g_{inv,acc}(a)$ is updated according to $g_{inv,acc}(a)=g_{inv,acc}(a)+g_{inv}(a)$ when the LUT address associated with the nth sample of the input signal is equal to a, wherein $g_{inv}(a)$ is an inverse gain.

According to a further embodiment of the disclosure, when the LUT address associated with the nth sample of the input signal is equal to a, the inverse gain $g_{inv}(a)$ is calculated according to one of $$g_{inv}(a) = \sum \frac{S_{i,n}}{S_{o,n}} \text{ or } g_{inv}(a) = \frac{\sum S_{i,n}}{\sum S_{o,n}},$$

wherein $S_{i,n}$ is the nth sample of the input signal, $S_{o,n}$ is the nth sample of the output signal, and the sums are over N samples of the input signal and N samples of the output signal.

DETAILED DESCRIPTION

Embodiments of the disclosure provide a method applicable to memoryless pre-distortion which directly populates the pre-distorting LUT from observations of the input waveform and output waveform from the PA, negating the need for steps (1) and (2) above.

In addition, direct population of the LUT removes the inherent constraint of a least squares solution whose pre-distortion function is a linear combination of non-linear polynomial basis functions. In practical applications, it is found that removing this constraint improves linearization performance.

Figure 1:
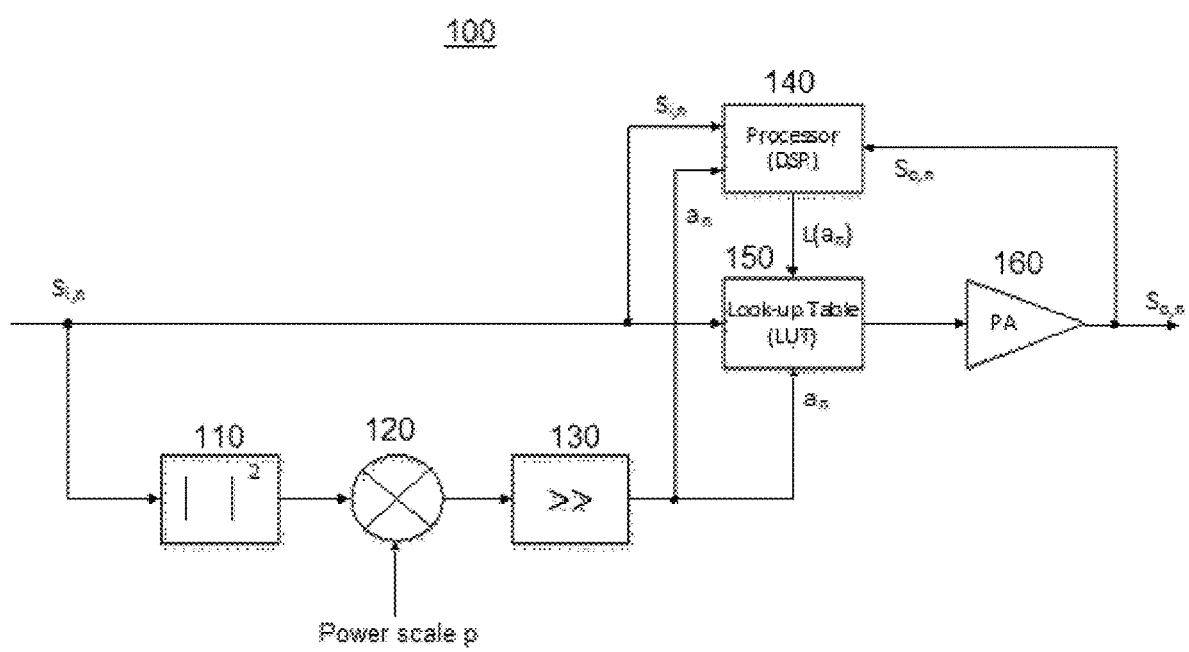
FIG. 1 shows a low-complexity memoryless pre-distortion architecture, according to an embodiment of the disclosure.

Embodiments of the disclosure provide a high-performance low-complexity memoryless digital pre-distortion method. Consider a memoryless pre-distortion architecture 100 shown in FIG. 1. FIG. 1 shows an input signal $S_{i,n}$, which is a complex baseband waveform received from a signal source, a first multiplier circuit 110 that sums the squares of the real and imaginary parts of the input signal $S_{i,n}$, a second multiplier circuit 120 that multiplies its input by a power scale p, a shift register circuit 130 that divides its input by a power of 2, a look-up-table (LUT) 150 of size $2^U$, a digital signal processing (DSP) circuit 140, and a power amplifier (PA) circuit 160. The input signal $S_{i,n}$ is provided to the multiplier circuit 110, the LUT 150, and the DSP 140. The output of the shift register circuit 130 is an address for the LUT 150, which is provided to the LUT 150 and the DSP 140, and the PA 160 outputs a signal $S_{o,n}$ to wireless communications channel. The first multiplier circuit 110, the second multiplier circuit 120, and the shift register circuit 130 may be considered to be an address calculation circuit. The DSP includes its own memory for storing intermediate calculation results.

An input signal $S_i$ that includes complex (I and Q) baseband waveform values, with real part Q and imaginary part I, is modified by a complex gain stored at address an of a Look-up Table (LUT) 150, whose value is dependent upon the instantaneous power of the n'th sample of the input waveform denoted by $S_{i,n}$. The system is classified as memoryless since the n'th output from the LUT is only dependent upon the n'th complex input $S_{i,n}$.

Each complex sample $S_{i,n}$ is a complex sample of real and imaginary parts represented as a digital number in both I and Q of M bits. The digital representation of the instantaneous power of $S_{i,n}$ is digital number of size 2M+1 bits that represents ($I^2+Q^2$). The size of the LUT (number of addresses) required to map each possible value of instantaneous power could therefore become very large. The LUT is of size $2^U$, with addresses a that range from 0 to $2^U1$ in value, i.e., $0<a<2^U-1$. To mitigate this and maintain a smaller LUT, the indexing value (instantaneous power) is scaled and divided by a fixed digital number $2^L$ and truncated so as to retain only the upper U bits from the instantaneous power value. This effectively maps the signal power to a much smaller range of values, typically 32 or 64 for U=5 or 6. This process is written mathematically as:

$$a_n = \left\lfloor \frac{p|S_{i,n}|^2}{2^L} \right\rfloor, \quad (1)$$

where $S_{i,n}$ is squared at block 110, p is the power scaling and is multiplied by $|S_{i,n}|^2$ at block 120, the division by $2^L$ is performed by shift register 130, and $\lfloor \bullet \rfloor$ is the floor function.

Embodiments of the disclosure are directed to a low complexity, and hence low resource cost, method that determines the required contents of the LUT 150 that linearize a power amplifier PA 160. That is, according to the figure, to determine the complex LUT function $L(a_n)$ such that $$S_{o,n} \approx G \times S_{i,n},$$

where $S_{o,n}$ is the n'th sample of the PA equivalent complex baseband output and G is the linear gain on the PA. After an algorithm according to an embodiment has run, the combination of the LUT and the PA is such that (ideally) any complex baseband sample at the input to the LUT appears at the output of the PA with the same complex value scaled by the linear gain G. In this situation the PA is said to have been linearized.

Referring to FIG. 1, the LUT contents, i.e. the complex value per LUT address, is computed by a Digital Signal Processor (DSP) 140 by observing the input IQ samples, the PA output IQ samples, and the LUT addresses $a_n$. An algorithm according to an embodiment is iterative in the sense that a set of waveforms is input one at a time and the output samples from the observed PA captured; the algorithm is run (see below) and the LUT contents are updated. The process is then iterated (repeated) a number of times, by inputting another waveform and running the algorithm again, until the either the algorithm has converged and no further linearization is possible or a sufficient linearization is obtained, whichever is reached first. The LUT contents are updated with new values that are computed by running with an input waveform and capturing the output from the PA and running the algorithm. This may be done one or multiple times before the LUT is updated.

In an embodiment, samples are collected per bin and processed as a batch for each iteration, unlike some other memoryless pre-distortion methods which process sample-by-sample. Updates to the LUT are applied once per training iteration. A training iteration itself may include processing more than one waveform, so that the inverse gain is accumulated over multiple waveforms and then the LUT is updated. Although this may slow down the linearization process, the updates will be less noisy, since more samples are used in the update computation. The LUT is updated with a tuneable update parameter.

According to an embodiment, the LUT is initialized to unity, i.e. $L(a)=1 \forall a$, and the accumulated inverse gains are initialized to zero i.e. $g_{inv,acc}(a)=0 \ \forall a$.

Embodiments of the disclosure include two variants. The calculations of these two variants are performed by the DSP. For each iteration the number of times a particular address a is 'hit' is accumulated in T(a). This is stored in the DSP memory. The DSP processes the input samples and corresponding PA output samples according to algorithms according to embodiments and consequently updates the LUT.

Variant 1:

Each input sample addresses the LUT at address $\bar{a}$. Across all input waveforms per iteration, the number of times a particular address a of the possible $0 \ldots 2^U-1$ LUT addresses is referenced is accumulated in a $2^U$ element array T(a):

$$T(a) = T(a) + 1, \text{ if } a_n = a, \ n = 0 \ldots N-1, \quad (2)$$

where N is the number of samples in the waveform. This is stored in the DSP. For each sample, an inverse gain is computed for each LUT address a:

$$g_{inv}(a) = \sum \frac{S_{i,n}}{S_{o,n}}, \text{ if } a_n = a, a = 0 \ldots 2^U - 1. \quad (3)$$

For each LUT address a, the inverse gains are accumulated for each waveform of an iteration:

$$g_{inv,acc}(a) = g_{inv,acc}(a) + g_{inv}(a) \text{ if } a_n = a. \quad (4)$$

When all waveforms have been transmitted through the PA, the contents of the LUT are updated for each address a for which $T(a) \neq 0$, according to:

$$L(a) = (1 - \mu)L(a) + \mu L(a)\frac{g_{inv,acc}(a)}{T(a)}, \quad (5)$$

where μ is a tuneable update rate parameter that determines the rate of convergence. A value of 1 will give fastest convergence.

Variant 2:

Variant 1 is relatively complex due to the complex division that computes the inverse gain for every sample of the input and output across all training waveforms and accumulates the number of samples within each LUT address a, and a final normalization division by the accumulated number T(a).

According to an alternative, less complex approach, the inverse gain is computed as the ratio of the summed input and output samples:

$$g_{inv}(a) = \frac{\sum S_{i,n}}{\sum S_{o,n}} \text{ if } a_n = a, a = 0 \ldots 2^U - 1. \quad (6)$$

This reduces the number of divisions per iteration to $2^U$.

Thus, for a given LUT address $a_n$, Variant 1 computes the sum of each division of every input sample with every output sample, so that the number of divisions is dependent on the number of samples falling into the address $a_n$. In Variant 2, the input and output samples are summed first and then the sums divided. The number of divisions per address is therefore 1.

Application Example:

An exemplary application of an algorithm according to an embodiment is in an electronic device that includes a wireless transmitter, such as a cellular telephone or a Bluetooth® enabled device. The source from which the wireless transmitter receives the signal to be amplified may be, for example, a human voice input into the microphone of a cellular telephone, or sound output from a music player, such as an MP3 player. In such a device, an algorithm according to an embodiment would be invoked upon start-up to train the LUTs and linearize the PA. Although the LUTs can be stored in non-volatile memory, the performance of the power amplifier can be affected by temperature, so that the LUTs should be re-trained at each startup. In this case, the saved LUT values are a starting point for the linearization process. In addition, since the temperature of the power amplifier typically increases during operation, the DSP can monitor the linearity of the output wireless signal and re-invoke an algorithm according to an embodiment while the power amplifier is operating if the linearity falls below a predetermined threshold. An algorithm according to an embodiment typically operates without any input form a human operator, and does not typically output any information to a human-readable device, such as a display monitor.

Figure 2:
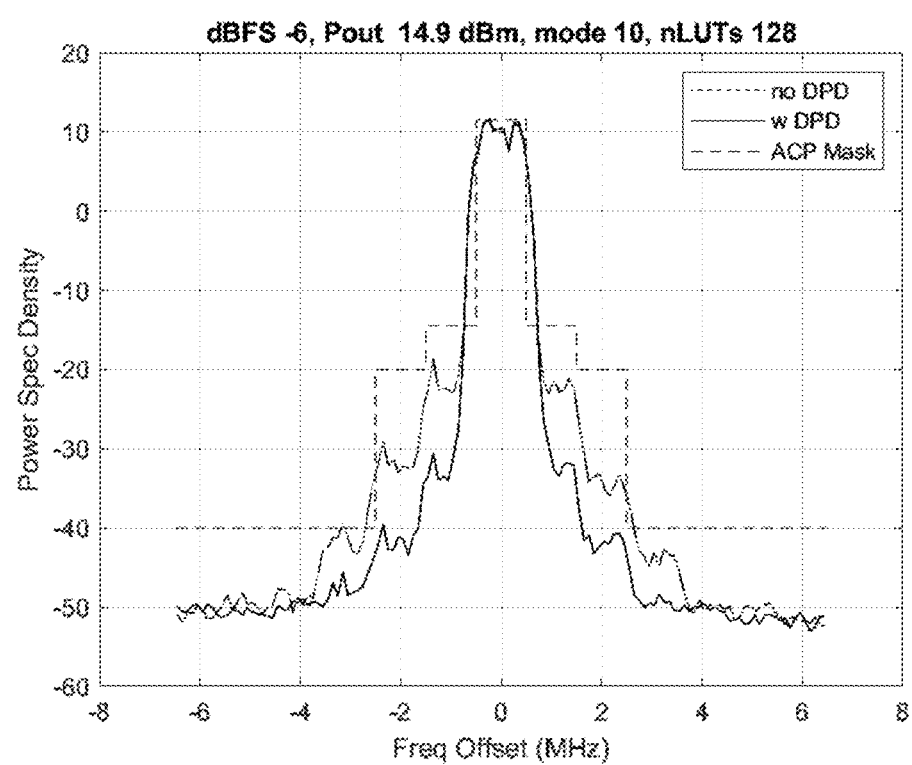
FIG. 2 shows an example of linearization performance, according to an embodiment of the disclosure.

Performance Example:

FIG. 2 illustrates an example of linearization performance, according to an embodiment. FIG. 2 shows the unlinearized and linearized spectrum of 2 MHz bandwidth Bluetooth compliant single carrier waveform.

Figure 3:
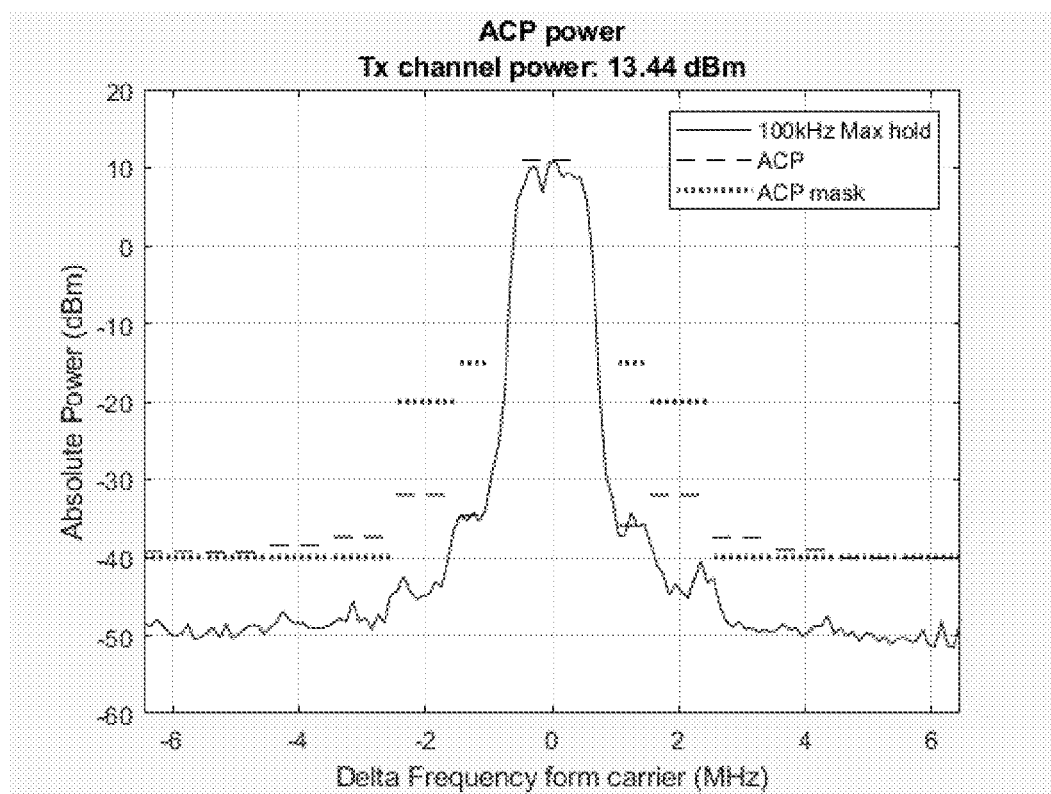
FIG. 3 shows the Adjacent Channel Power (ACP) performance of a High Performance LUT-based Memoryless pre-distortion training algorithm, according to an embodiment of the disclosure.

FIG. 3 shows the Adjacent Channel Power (ACP) performance of a High Performance LUT-based Memoryless pre-distortion training algorithm, according to an embodiment of the disclosure. Ideally, all the power should appear within the modulation bandwidth of the signal, which is typically constrained by a root-raised cosine filter at the transmitter, or the channel. In practice, the nonlinear PA spreads the power into adjacent channels where other signals could be transmitted and cause interference to those signals. When the PA is linearized, the adjacent power is significantly reduced to acceptable levels, as can be seen from the figures.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangibly embodied on a computer readable program storage device and executed by a digital signal processor (DSP). The application program can be uploaded to, and executed by, a machine comprising any suitable architecture. In another embodiment, the present disclosure can be implemented by a combination of hardware elements and software as an application program tangibly embodied on a computer readable program storage device and executed by a digital signal processor (DSP).

Figure 4:
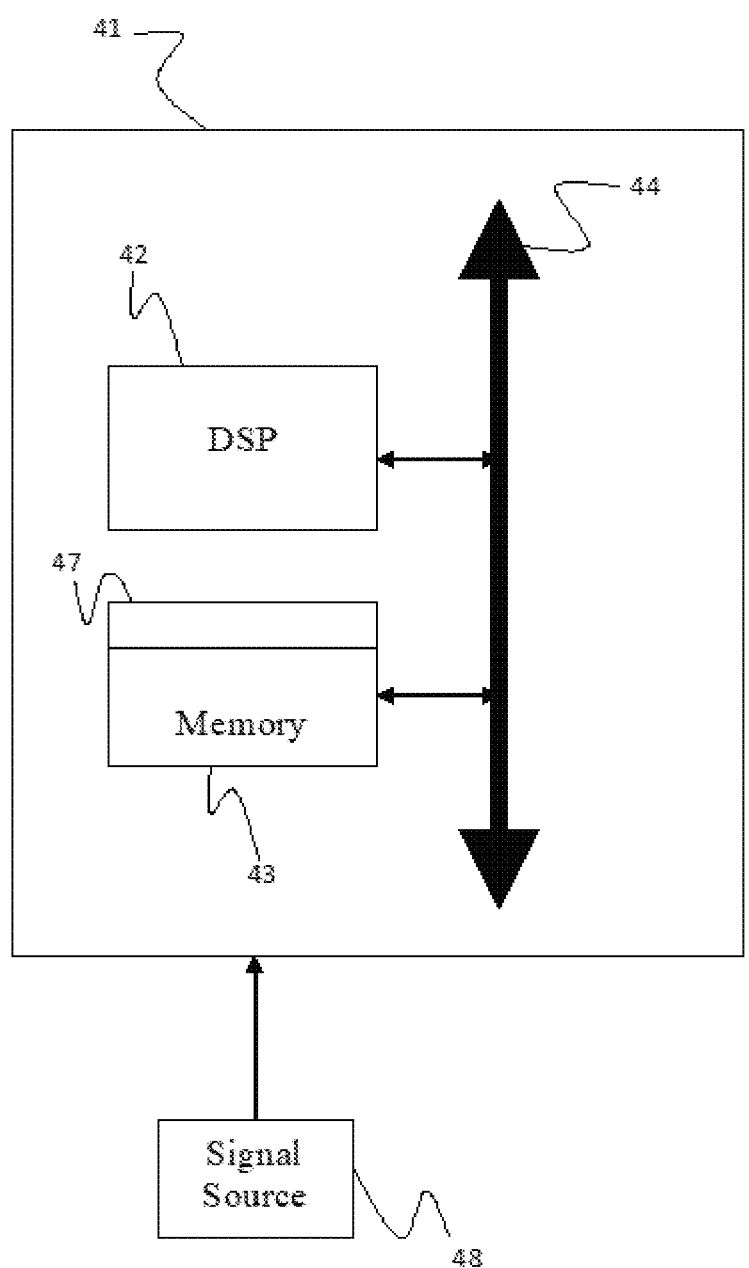
FIG. 4 is a block diagram of a system for implementing a method of memoryless digital pre-distortion, according to an embodiment of the disclosure.

FIG. 4 is a block diagram of a system for implementing a method of memoryless digital pre-distortion, according to an embodiment of the disclosure. Referring now to FIG. 4, a computer system 41 for implementing the present disclosure can comprise, inter alia, a digital signal processor (DSP) 42 and a memory 43 coupled through a bus 44. The support circuits can include circuits such as cache, power supplies, clock circuits, and a communication bus. The memory 43 can include random access memory (RAM), read only memory (ROM), disk drive, tape drive, etc., or a combinations thereof. The present disclosure can be implemented as a routine 47 that is stored in memory 43 and executed by the DSP 42 to process the signal from the signal source 48. As such, the computer system 41 is a general purpose computer system that becomes a specific purpose computer system when executing the routine 47 of the present disclosure.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of digital memoryless pre-distortion, comprising:
   receiving an input digital signal from a signal source;
   calculating a look-up table (LUT) address based on a sample of the input signal, a power scale, and a factor to retain a predetermined number of upper bits in the sample;
   updating an LUT value associated with the LUT address based on the input signal and an output signal that is output from a power amplifier to a wireless communications channel;
   linearizing the output signal with the updated LUT value; and
   outputting the output signal to the wireless communications channel,
   wherein the steps of updating an LUT value associated with the LUT address and linearizing the output signal with the updated LUT value are repeated until a level of linearization is achieved that meets a pre-defined standard.

2. The method of claim 1, wherein the look-up table (LUT) address is calculated from $a_n = \lfloor p |S_{i,n}|^2 / 2^L \rfloor$, wherein $a_n$ is the LUT address of an nth sample of the input signal, $S_{i,n}$ is the nth sample of the input signal, p is the power scale, $2^L$ is used to retain a predetermined number of upper bits in $a_n$ and $\lfloor . \rfloor$ is the floor function.

3. The method of claim 1, wherein the LUT value associated with the LUT address is updated according to $L(a) = (1-\mu)L(a) + \mu L(a) g_{inv,acc}(a) / T(a)$, wherein L(a) is the LUT value associated with LUT address a, $g_{inv,acc}$ (a) is an accumulated inverse gain that is a function of the input signal and the output signal, T(a) is a number of times that LUT address a has been indexed by samples of the input signal, and $\mu$ is a predetermined update rate parameter that determines the rate of convergence.

4. The method of claim 3, wherein L(a) was initialized to 1.

5. The method of claim 3, wherein T(a) is incremented when the LUT address associated with the nth sample of the input signal is equal to a.

6. The method of claim 3, wherein the accumulated inverse gain $g_{inv,acc}$ (a) is updated according to $g_{inv,acc}$ (a) = $g_{inv,acc}$ (a) + $g_{inv}$ (a) when the LUT address associated with the nth sample of the input signal is equal to a, wherein $g_{inv}$ (a) is an inverse gain.

7. The method of claim 6, wherein the inverse gain $g_{inv}$ (a) is calculated according to $$g_{inv}(a) = \sum \frac{S_{i,n}}{S_{o,n}}$$

when the LUT address associated with the nth sample of the input signal is equal to a, wherein $S_{i,n}$ is the nth sample of the input signal, $S_{o,n}$ is the nth sample of the output signal, and the sum is over N samples of the input signal and N samples of the output signal.

8. The method of claim 6, wherein the inverse gain $g_{inv}$ (a) is calculated according to $$g_{inv}(a) = \frac{\sum S_{i,n}}{\sum S_{o,n}}$$

when the LUT address associated with the nth sample of the input signal is equal to a, wherein $S_{i,n}$ is the nth sample of the input signal, $S_{o,n}$ is the nth sample of the output signal, and each sum is over N samples of the input signal and N samples of the output signal.

9. An apparatus for performing digital memoryless pre-distortion of a signal to be amplified, comprising:
   an address calculation circuit directly connected to an electronic signal source;
   a digital signal processor (DSP) directly connected to the electronic signal source, an output of the address calculation circuit, and a wireless communications channel;
   a look-up table (LUT) directly connected to the electronic signal source, the output of the address calculation circuit, and an output of the DSP; and
   a power amplifier (PA) connected to an output of the LUT and that outputs an output signal to the wireless communications channel and the DSP, wherein
   the address calculation circuit calculates an address for the LUT from an input signal received from the electronic signal source and a scale factor,
   the DSP updates an LUT value associated with the LUT address based on the input signal and the output signal received from the power amplifier, and the PA linearizes the output signal with the updated LUT value and outputs the output signal to the wireless communications channel.

10. The apparatus of claim 9, wherein the address calculation circuit comprises:

a first multiplier connected to the electronic signal source that sums squares of real and imaginary parts of the input signal and outputs a squared input signal;

a second multiplier connected to an output of the first multiplier and that multiplies the squared input signal by the scale factor; and a shift register connected to an output of the second multiplier and divides the output of the second multiplier by $2^L$ wherein a predetermined number of upper bits of the second multiplier output are retained.

11. The apparatus of claim 9, wherein the DSP repeatedly updates the LUT value associated with the LUT address and the PA repeatedly linearizes the output signal with the updated LUT value until a level of linearization is achieved that meets a pre-defined standard.

12. The apparatus of claim 9, wherein the LUT value associated with the LUT address is updated according to $$L(a) = (1 - \mu)L(a) + \mu L(a)\frac{g_{inv,acc}(a)}{T(a)},$$

wherein L(a) is the LUT value associated with LUT address a, $g_{inv,acc}$ (a) is an accumulated inverse gain that is a function of the input signal and the output signal, T(a) is a number of times that LUT address a has been indexed by samples of the input signal, and μ is a predetermined update rate parameter.

13. The apparatus of claim 12, wherein L(a) was initialized to 1.

14. The apparatus of claim 12, wherein T(a) is incremented when the LUT address associated with the nth sample of the input signal is equal to a.

15. The apparatus of claim 12, wherein the accumulated inverse gain $g_{inv,acc}$ (a) is updated according to $g_{inv,acc}$ (a)=$g_{inv,acc}$ (a)+$g_{inv}$ (a) when the LUT address associated with the nth sample of the input signal is equal to a, wherein $g_{inv}$ (a) is an inverse gain.

16. The apparatus of claim 15, wherein the inverse gain $g_{inv}$(a) is calculated according to $$g_{inv}(a) = \sum \frac{S_{i,n}}{S_{o,n}}$$

when the LUT address associated with the nth sample of the input signal is equal to a, wherein $S_{i,n}$ is the nth sample of the input signal, $S_{o,n}$ is the nth sample of the output signal, and the sum is over N samples of the input signal and N samples of the output signal.

17. The apparatus of claim 15, wherein the inverse gain $g_{inv}$ (a) is calculated according to $$g_{inv}(a) = \frac{\sum S_{i,n}}{\sum S_{o,n}}$$

when the LUT address associated with the nth sample of the input signal is equal to a, wherein $S_{i,n}$ is the nth sample of the input signal, $S_{o,n}$ is the nth sample of the output signal, and each sum is over N samples of the input signal and N samples of the output signal.

18. A digital electronic circuit, tangibly embodying a program of instructions executed by the digital electronic circuit to perform a method for digital memoryless predistortion, the method comprising:

receiving an input digital signal from a signal source;

calculating a look-up table (LUT) address from the input signal and a power scale; and updating an LUT value associated with the LUT address based on the input signal and an output signal that is output from a power amplifier to a wireless communications channel, wherein the LUT value associated with the LUT address is updated according to $$L(a) = (1 - \mu)L(a) + \mu L(a)\frac{g_{inv,acc}(a)}{T(a)},$$

wherein L(a) is the LUT value associated with LUT address a, $g_{inv,acc}$ (a) is an accumulated inverse gain that is a function of the input signal and the output signal, T(a) is a number of times that LUT address a has been indexed by samples of the input signal, and μ is a predetermined update rate parameter that determines the rate of convergence.

19. The digital electronic circuit of claim 18, wherein T(a) is incremented when the LUT address associated with the nth sample of the input signal is equal to a, and the accumulated inverse gain $g_{inv,acc}$ (a) is updated according to $g_{inv,acc}$ (a)=$g_{inv,acc}$ (a)+$g_{inv}$ (a) when the LUT address associated with the nth sample of the input signal is equal to a, wherein $g_{inv}$ (a) is an inverse gain.

20. The digital electronic circuit of claim 19, wherein, when the LUT address associated with the nth sample of the input signal is equal to a, the inverse gain $g_{inv}$ (a) is calculated according to one of $$g_{inv}(a) = \sum \frac{S_{i,n}}{S_{o,n}} \text{ or } g_{inv}(a) = \frac{\sum S_{i,n}}{\sum S_{o,n}},$$

wherein $S_{i,n}$ is the nth sample of the input signal, $S_{o,n}$ is the nth sample of the output signal, and the sums are over N samples of the input signal and N samples of the output signal.

* * * * *